＊

US007404042B2

(12) United States Patent
Stempel et al.

(10) Patent No.: US 7,404,042 B2
(45) Date of Patent: Jul. 22, 2008

(54) HANDLING CACHE MISS IN AN INSTRUCTION CROSSING A CACHE LINE BOUNDARY

(75) Inventors: Brian Michael Stempel, Raleigh, NC (US); Jeffrey Todd Bridges, Raleigh, NC (US); Rodney Wayne Smith, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 11/132,749

(22) Filed: May 18, 2005

(65) Prior Publication Data

US 2006/0265572 A1    Nov. 23, 2006

(51) Int. Cl.
  *G06F 12/00* (2006.01)
  *G06F 13/00* (2006.01)
  *G06F 13/28* (2006.01)

(52) U.S. Cl. .................. 711/123; 711/125; 711/201; 711/137; 712/204; 712/205; 712/206; 712/207

(58) Field of Classification Search ............ 711/201, 711/123
See application file for complete search history.

(56) References Cited

U.S. PATENT DOCUMENTS

| 6,393,549 | B1 * | 5/2002 | Tran et al. .................. 712/204 |
| 6,457,117 | B1 * | 9/2002 | Witt ........................... 712/213 |
| 2002/0087801 | A1 * | 7/2002 | Bogin et al. ................ 711/137 |
| 2003/0196044 | A1 * | 10/2003 | Ramirez et al. ............ 711/137 |
| 2005/0193175 | A1 * | 9/2005 | Morrow ..................... 711/125 |
| 2006/0184738 | A1 * | 8/2006 | Bridges et al. ............. 711/125 |
| 2007/0180218 | A1 * | 8/2007 | Caprioli et al. ............ 711/207 |
| 2008/0034187 | A1 * | 2/2008 | Stempel et al. ............ 712/205 |

FOREIGN PATENT DOCUMENTS

EP    0651322    3/1995

OTHER PUBLICATIONS

Joon-Seo Yim, In-Cheol Park and Chong-Min Kyung; Swed: A Cache Architecture to Speed up the Misaligned Instruction Prefetch; IEICE Transactions on Information and Systems, Information & Systems Society, Tokyo, Japan; col. E80-D, No. 7; Jul. 1997; pp. 742-745.

* cited by examiner

*Primary Examiner*—Donald Sparks
*Assistant Examiner*—Prasith Thammavong
(74) *Attorney, Agent, or Firm*—Thomas Rouse; Nicholas J. Pauley; John L Ciccozzi (57) ABSTRACT

A fetch section of a processor comprises an instruction cache and a pipeline of several stages for obtaining instructions. Instructions may cross cache line boundaries. The pipeline stages process two addresses to recover a complete boundary crossing instruction. During such processing, if the second piece of the instruction is not in the cache, the fetch with regard to the first line is invalidated and recycled. On this first pass, processing of the address for the second part of the instruction is treated as a pre-fetch request to load instruction data to the cache from higher level memory, without passing any of that data to the later stages of the processor. When the first line address passes through the fetch stages again, the second line address follows in the normal order, and both pieces of the instruction are can be fetched from the cache and combined in the normal manner.

18 Claims, 3 Drawing Sheets

HANDLING CACHE MISS IN AN INSTRUCTION CROSSING A CACHE LINE BOUNDARY

TECHNICAL FIELD

The present subject matter relates to techniques and processor architectures to effectively handle fetching of an instruction crossing a cache line boundary, particularly where a second portion of the instruction is not yet in the cache from which the processor attempts to fetch the instruction (cache miss).

BACKGROUND

Modern microprocessors and other programmable processor circuits utilize a hierarchy of memories to store and supply instructions. A common hierarchy includes an instruction cache or L1 cache that is relatively close to the core of the processor, for example, on the processor chip. Instructions are loaded to the L1 instruction cache from a somewhat more remote or L2 cache, which stores both instructions and data. One or both caches are loaded with instructions from main memory, and the main memory may be loaded from more remote sources, such as disk drives of the device that incorporates the processor. The cache memories enhance performance. Because of its proximity to the processor core, for example, fetching of instructions from the L1 cache is relatively fast.

In many implementations, a line of the instruction cache holds a number of instructions. If the number of bits per instruction is fixed for all instructions, a cache line can be sized to hold an integer number of such instructions. For example, if each instruction is 32 bits, a 256-bit cache line will hold eight such instructions, and the boundaries of the first and last instructions stored in the line match or align with the boundaries of the cache line. However, if the processor handles instructions of different lengths, e.g. 32-bit instructions and 16-bit instructions, then the instructions in a given cache line may not align with the boundaries of that line. If the processor architecture mandates that an instruction may not overlap two cache lines, then there will be some wastage. However, many architectures do not impose such a cache restriction. In the later cases, problems occur in reading an instruction that has part stored in one line and the rest stored in another line, e.g. a 32-bit instruction having 16 bits at the end of one line of the cache and the other 16 bits stored at the beginning of the next cache line.

Modern programmable processor circuits often rely on a pipeline processing architecture, to improve execution speed. A pipelined processor includes multiple processing stages for sequentially processing each instruction as it moves through the pipeline. Of course while one stage is processing an instruction, other stages along the pipeline are concurrently processing other instructions. Each stage of a pipeline performs a different function necessary in the overall processing of each program instruction. Although the order and/or functions may vary slightly, a typical simple pipeline includes an instruction Fetch stage, an instruction Decode stage, a memory access or Readout stage, an instruction Execute stage and a result Write-back stage. More advanced processor designs break some or all of these stages down into several separate stages for performing sub-portions of these functions. Super scalar designs break the functions down further and/or provide duplicate functions, to perform operations in parallel pipelines of similar depth.

The Fetch stage is the portion of the pipeline processor that obtains the instructions from the hierarchical memory system. In many pipeline designs, the Fetch operation is broken down into two or more stages. Of these stages, one stage collects the instructions when fetched from the L1 cache and communicates with the higher level memories to obtain instruction data not found in the L1 cache.

A problem can occur in such a fetch operation where the boundaries of the instructions cross the cache line boundaries, and part of a desired instruction is not yet present in the L1 cache. For example, if the stage that collects the instructions fetched from the L1 cache receives a first part of the instruction, it will not communicate with the higher level memories because the instruction was found in the L1 cache. Similarly, if that stage has already obtained the line containing the first piece from the higher level memory, it will not initiate a second request for the line containing the other piece of the instruction. Instead, it waits to receive the rest of the instruction from processing of the next cache line by the preceding stage. However, if the preceding stage detects that the rest of the desired instruction is not in the appropriate line of the L1 cache (a miss), it can not provide the remaining part of the instruction, and it does not have the capability to access the higher level memories to obtain the missing piece of the instruction. Normally, in the case of a miss, this stage would drop the address down to the next stage to request the data from higher level memory, but that next stage is waiting for the second piece of a split instruction to come from the preceding stage. In some extreme cases, the Fetch processing may lock up for some period waiting for a portion of the instruction that neither stage can request.

It might be possible to allow more than one stage in the fetch section of the pipeline to request instructions from the other memory resources, to avoid the above-identified problem. Such a solution, however, adds complexity, in construction of the fetch stages, in the interconnection of the fetch stages to other memory resources and in the management of flow of instructions to and through the fetch stages. For a high performance processor design, it is desirable to make requests to higher level memory resources from as few places as possible, e.g. because each such request delays other processing while waiting for return of requested data. Hence, there is still further room for improvement in fetching instructions, where instructions may cross cache line boundaries.

SUMMARY

The teachings herein provide more effective handling of the cache miss, where an instruction crosses a cache line boundary. Essentially, an address corresponding to the cache line for the first part of the instruction is recycled to the head of the fetch part of the pipeline, without any of the associated first part of the instruction from the cache line dropping down to the later stages of the pipeline. The address corresponding to the line for the second part of the instruction, that is to say the address that resulted in the cache miss, is treated as a pre-fetch request. Since there is a miss, the processor begins loading the necessary instruction data to the instruction cache, but this data also is not dropped to the later stages of the pipeline on this pass through the fetch stages. When the first line address passes through the fetch stages again, and the second line address follows in normal sequence, all of the pieces of the instruction are available and can be fetched and combined in the normal manner.

Hence, aspects of the present teaching encompass methods of fetching an instruction from memory for execution in a programmable processor, in which instructions may cross a line boundary. An example of such a method might involve detecting that an instruction to be fetched crosses a boundary between instruction lines. Upon fetching a first line of instruction data containing a first piece of the boundary crossing instruction, a determination is made whether or not a second piece of the boundary crossing instruction is in cache memory. If not, the fetch of the first line of instruction data is recycled, without output of any of the instruction from the first line of data. Then, the method involves pre-fetching a second line of instruction data, which includes the absent piece of the instruction. Having recycled the fetch for the first line, processing then entails fetching the first line of instruction data and fetching the second line of instruction data. The pieces from the fetched first and second lines of instruction data are combined to output the boundary crossing instruction.

If there is any later fetch that has begun before the second fetch regarding the first line, that is to say, if there would be any other fetch operation in progress between the recycled fetch and the pre-fetch for the second line, any such intervening fetch processing is flushed from the fetch pipeline. When the fetch regarding the first line is recycled, the data resulting from the fetch during the initial pass is invalidated, so that no data drops out of the fetch section.

Other aspects of the present teachings encompass fetch sections or systems, for fetching instructions for processing through a programmable processor, such as a pipeline processor. In an example, such a fetch section comprises an instruction cache and at least one processing stage for processing addresses in sequence. For each address, the processing identifies a line of memory in the instruction cache that may contain an instruction or a portion thereof corresponding to each respective address. The processing also reads data from the identified line. Means are provided for recycling a fetch with regard to a first address to the first instruction cache processing stage and for converting a fetch with regard to second address to a pre-fetch to enable loading of a line of instruction data from the higher level memory resource to the instruction cache, in the event that an instruction that crosses a boundary between lines and a line of the cache corresponding to the second address for that instruction does not initially contain a piece of the boundary crossing instruction.

Other aspects of the present teachings encompass programmable processors, particularly pipeline processors, incorporating such a fetch section.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

As discussed herein, an example of a system or section of a processor intended to fetch instructions for the processor comprises an instruction cache and a plurality of processing stages. As such, the fetch section itself typically is formed of a pipeline of processing stages. Instructions are allowed to cross cache line boundaries. When a stage from which requests to higher level memories are made has a first part of an instruction that crosses a cache line boundary, it checks the next line. If that stage determines that the second part of the boundary crossing instruction data is not contained in the cache (L1), it invalidates the initial fetch of the part of the instruction from the first line and returns the first fetch address back to start of fetch pipeline. When the processing for the second address moves to that stage, the second fetch has been converted to a touch or pre-fetch operation. Processing therefore loads data to the instruction cache, but does not pass the second line to the decode stage on this first pass through the fetch pipeline. As a result, the instruction line containing the second piece of the instruction is in the cache. When the fetch stages process the first address again (after re-cycling), the second address follows again in the normal order, and the line in the cache for the second address now contains the necessary second piece of the boundary crossing instruction. The part for the desired instruction from the second line can be dropped down into the fetched first line (replacing an otherwise unneeded piece of data in the first line), to complete the desired instruction within one cycle of output from the fetch stage.

In the example, any stages of the pipeline higher than (preceding) the stage containing the second fetch address are flushed. As a result, no instruction line data is output from the fetch pipeline until the desired instruction is combined in one cycle during the second pass through the instruction fetch pipeline.

Figure 1:
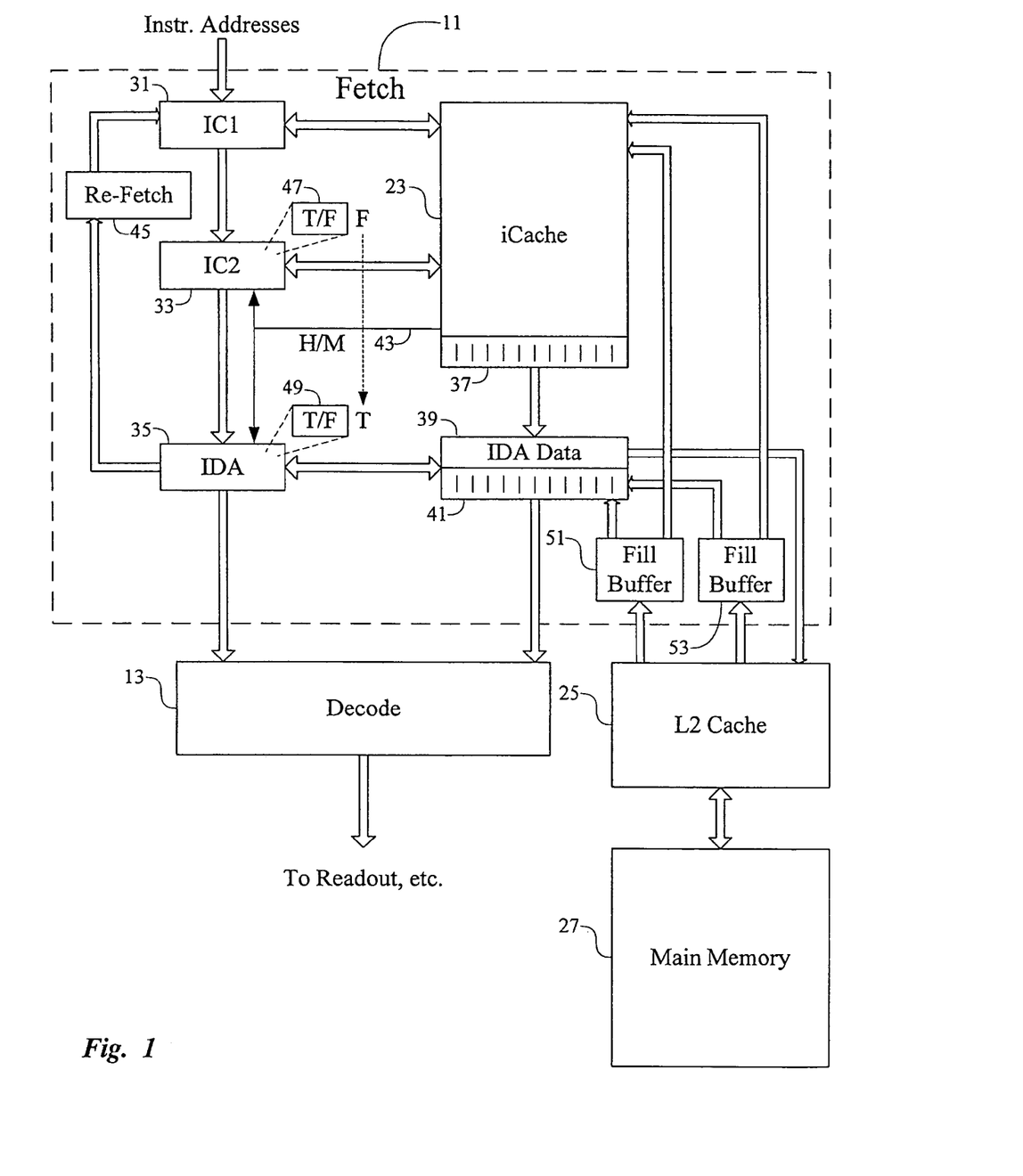
FIG. 1 is a high level block diagram of a portion of programmable processor, including exemplary elements of a fetch section implementing techniques for efficient handling of boundary crossing instructions.
Figure 2:
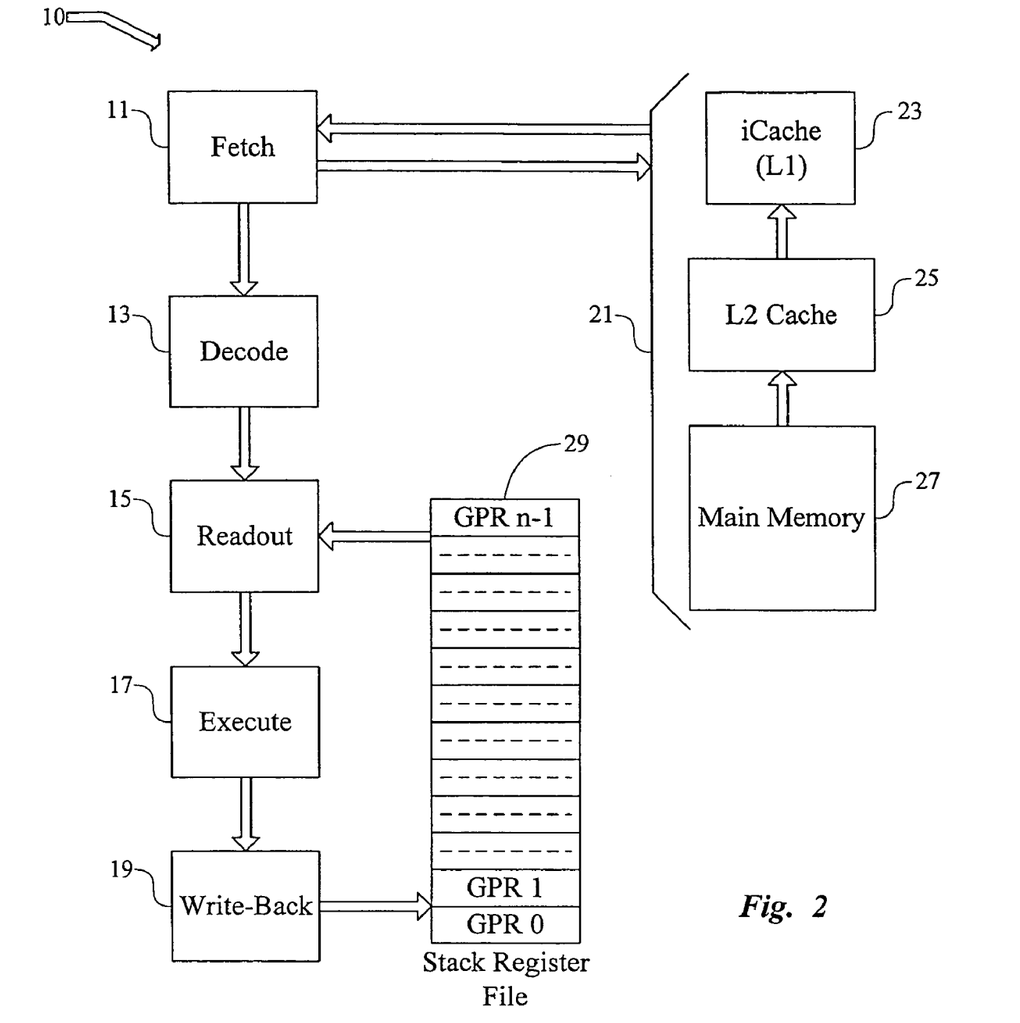
FIG. 2 is a functional block diagram of a pipeline implementation of a programmable processor, which may incorporate the elements shown in FIG. 1.

Reference now is made in detail to the examples illustrated in the accompanying drawings and discussed below. FIG. 1 illustrates several stages of a pipeline processor and associated memories. FIG. 2 depicts the overall pipeline, whereas FIG. 1 shows somewhat more detail of a first section of the pipeline, as will be involved in fetching instructions from the memories and handling instructions crossing cache line boundaries as discussed herein.

With reference to FIG. 2, the simplified pipeline processor 10 includes five major categories of pipeline processing stages, Fetch 11, Decode 13, Readout 15, Execute 17 and Write-back 19. The arrows in the diagram represent logical data flows, not necessarily physical connections. Those skilled in the art will recognize that any or all of these stages may be broken down into multiple stages performing portions of the relevant function, or that the pipeline may include additional stages for providing additional functionality. An actual super scalar example may consist of two or more parallel pipelines, each for example comprising multiple stages. For discussion purposes, several of the major categories of stages are shown as single stages, although typically each is broken down into two or more stages. The section of particular interest to the present discussion of the handling of instructions crossing cache line boundaries is the Fetch section 11, hence the separate stages forming that section are shown in more detail in FIG. 1. Although not shown separately in FIGS. 1 and 2, each stage of the pipeline 10 typically comprises a state machine or the like implementing the relevant logic functions and an associated register for passing the instruction and/or any processing results to the next stage or back to the GPR register file 29.

In the exemplary pipeline 10, the first section of the pipeline processor 10 performs an instruction Fetch function 11. The Fetch section comprises one or more stations for obtaining instructions for processing by later stages. The Fetch stage(s) 11 obtain the instructions from a hierarchy of memories represented generically by the memories 21. The memories 21 typically include an instruction cache (iCache) sometimes referred to as a level 1 (L1) cache 23, a level 2 (L2) cache 25 and main memory 27. Instructions may be loaded to main memory from other sources, e.g. a boot ROM or disk drive. Although some of the memories, such as the instruction cache, may be in or close to the core of the processor 10, other memories such as the main memory will be outside or separate from the processor 10. In some architectures, the instruction cache 23 may be an element of the Fetch section 11 (as shown for example in FIG. 1).

The L2 cache 27 stores both instructions and data to be processed (operand data). The L2 cache 27 is shared by both the instruction cache 23 and a data cache (not shown) used during operand data readout, e.g. by stage 15. The L2 cache 27 is both larger and slower to access than the instruction cache 23. Main memory 27, in turn is still larger and slower to access, but stores considerably more information. A fetch from the instruction cache 23, for example, may require three processing cycles, a fetch from L2 cache 25 may consume 10 or so processing cycles, whereas a fetch from main memory 27 may require something on the order of 100 processing cycles.

The Fetch stage 11 supplies each instruction to a Decode stage 13. Logic of the instruction Decode stage 13 decodes the instruction bytes received and supplies the result to the next stage of the pipeline.

The next major category of stages provides data access or Readout, as represented collectively by the stage 15. Logic of the Readout stage(s) 15 accesses operand data in specified registers in a general purpose register (GPR) file 29. In some cases, the logic of the Readout stage(s) 15 may obtain operand data from memory or other resources (not shown).

The instruction and operand data are passed to one or more stages 17 providing the Execute function. The Execute stage(s) 17 essentially execute the particular function of each instruction on the retrieved operand data and produce a result. The stage or stages 17 providing the Execute function may, for example, implement an arithmetic logic unit (ALU). The stage 19 writes the results back to a register in the file 29 or to memory such as the L2 cache 25 and/or main memory 27.

As noted, FIG. 1 shows the stages of a pipeline and associated elements forming the Fetch section 11 in somewhat more detail. As shown there, an exemplary Fetch section 11 comprises three pipeline stages 31, 33 and 35 for sequentially processing addresses. As addresses flow through the stages of the Fetch pipeline section 11, only one address is in and being processed in each one of the stages at any given time. Generally, for a given address, a first cycle (in the IC1 stage 31) processes the address to identify the tag for the appropriate memory line of the instruction cache 23. The second cycle (in the IC2 stage 33) uses the tag to access the particular line of the instruction cache 23. The instruction data alignment (IDA) section of the fetch pipeline includes an IDA stage 35 for processing the address data dropped down from the IC2 stage 33 and an IDA data stage 39 for processing data dropped down from the iCache 23 to extract actual instructions. Hence, the third cycle (in IDA elements 35 and 39) processes the data from the particular line of the instruction cache 23 to recover at least the one instruction, e.g. a 16 or 32 bit instruction from 8 or more on the line, for output to the Decode stage 13. Those skilled in the art will understand that the processor may be designed to extract two or more instructions from a line of cache data in the IDA stage.

More specifically, addresses for instructions are supplied to the first stage IC1 31 in the order of intended execution. Often, the order is sequential, although program execution may change the order, e.g. upon occurrence of the condition for a conditional branch instruction. A line of memory of the instruction cache 23 is accessed using a corresponding tag. The first instruction cache processing stage (IC1) 31 uses a content addressable memory (CAM) to identify tags for cache lines, in response to the received instruction addresses. The tag is a subset of the address used to search for cached instructions. Essentially, the CAM (IC1) stage 31 takes the address (tag) and compares it to the possible tags that it could match in the cache 23, creating a set of search results. These are captured at the end of the CAM cycle and used during the RAM (IC2) cycle when the address is in stage 33, so as to steer the correct data out of the cache 23 to be captured into IDA data stage 39. The latch 37 shown at the output of the cache 23 in FIG. 1 is a transparent latch, in case pipeline holds prevent immediate capture of the data output by the cache into IDA.

As noted above, one tag corresponds to one line of memory in the instruction cache 23, but each line holds a number of instructions. Hence, processing of one tag to recover a specified line from memory recovers a plurality of stored instructions at the IC2 stage 33. The third stage 35, referred to here as the IDA (instruction data alignment) stage, controls an IDA data processing section 39 to receive and process data from the selected instruction line. The bottom line or register 37 of the instruction cache 23 holds the instruction data from the selected memory line. The IDA Data section 39 includes register 41 to receive and process data from the latch 37. In an example, the register 41 may be a 64 bit latch. The IDA processing in the stage 35 and the register 37 essentially selects appropriate bits from the bottom 39 of the instruction cache 23, reorganizes those bits as necessary so as to align the bits to reform them as an instruction, and outputs the recovered instruction to the decode stage 13. As discussed more later, other elements of the IDA Data section 39 perform related functions, such as obtaining instruction data from higher level memories 25 and 27 in the event of a cache miss.

Some processor architectures, such as 'ARM' type processors licensed by Advanced Risc Machines Limited, support at least two instruction sets, where the instructions of one set have a different length than those in the other set. In an ARM type processor, for example, the standard instructions are 32 bits long. The second or 'Thumb' instruction set consists of 16-bit compressed instructions and 32-bit instructions encoded differently than their counterparts in ARM state. 16-bit Thumb instructions are decompressed to their 32-bit ARM equivalents and then can be processed in the normal manner. However, because of the reduced length, the 16-bit Thumb instructions require less storage in the various memory devices in or associated with the processor 10. Typically, the instructions having the longer word length offer a wider range of operations and/or more powerful or more involved operations. As noted, the instructions having shorter word length provide memory savings for programs or subroutines for which the limited capabilities of the smaller instruction set are adequate.

The machine operates in one of several "States"—ARM, Thumb, Jazelle-X/T2EE, etc. . . . and only may act on instructions that are architected for that State. ARM State includes only 32-bit instructions, and any encoding is legal in the five most significant bits. Thumb State includes a mixture of 16- and 32-bit instructions, as does T2EE. In these States, the five most significant bits determine whether the instruction in question is a 16-bit instruction or a 32-bit instruction.

Figure 3:
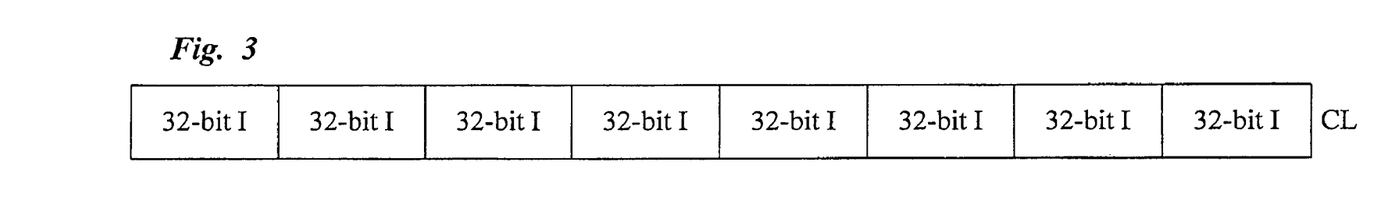
FIG. 3 depicts instruction data from a line of the instruction cache, wherein the cache line contains eight 32-bit instructions.
Figure 4:
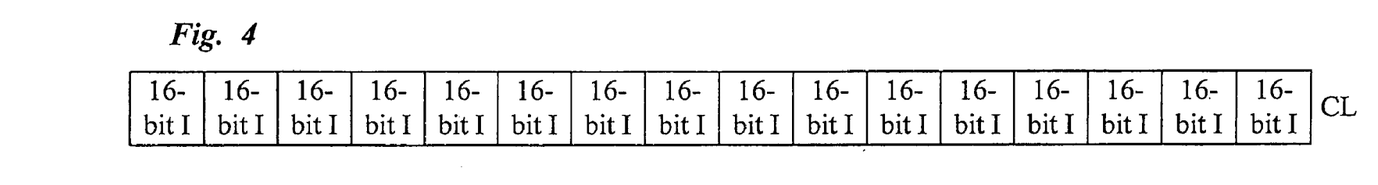
FIG. 4 depicts instruction data from a line of the instruction cache, wherein the cache line contains sixteen 16-bit instructions.

As shown in FIG. 3, an example of a 256-bit cache memory line may hold eight 32-bit instructions. In ARM, every instruction consists of a 32-bit word, and every 32-bit instruction aligns with a 32-bit word line boundary, e.g. in lines of the instruction cache 23. If a cache line includes only 16-bit Thumb instructions, e.g. when the processor is operating in a Thumb mode, the same cache line may hold sixteen 16-bit instructions, as shown in FIG. 4. Some processors and/or some operations modes, including Thumb, will permit mixing of 32-bit and 16-bit instructions, and thus one cache line will contain a mix of 32-bit and 16-bit instructions.

Figure 5:
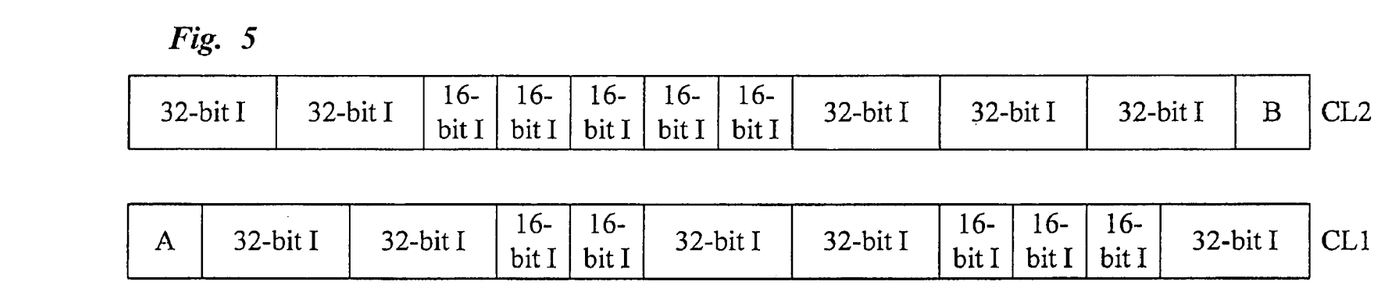
FIG. 5 depicts instruction data from two lines of the instruction cache, each of which includes a mix of 16-bit and 32-bit instructions and a portion of a boundary crossing 32-bit instruction.

FIG. 5 shows two successive lines, holding different combinations of 32-bit and 16-bit instructions on each cache line. The arrangement of the instructions in the lines is purely arbitrary and will vary over time as the processor 10 operates on different ARM and Thumb instructions. At times, the instructions will align with cache line boundaries. However, situations will occur at times, as represented by the example of FIG. 5, in which a 32-bit instruction crosses a boundary between two cache lines. In this example, the last 16-bits on the first line CL1 hold half A of a 32-bit instruction. The first 16-bits on the second line CL2 hold the other half B of the same 32-bit instruction. Consider now the processing of the A-B instruction through the Fetch pipeline 11 of FIG. 1.

During a first processing cycle, the IC1 stage 31 initially receives the address corresponding to the line CL1 containing part A and processes that address to recover the tag for line CL1. In the next processing cycle, the IC2 stage 33 uses that tag to access the CL1 line and move the data on that line to the latch 37 at the bottom of the instruction cache 23. The cache 23 also provides a hit indication on hit (H) or miss (M) line 43 indicating that the CL1 line now in latch 37 at the bottom of the cache contains the desired part A of the instruction. While IC2 is processing the search results for CL1, that is to say during the second processing cycle, the IC1 stage 31 receives the next address, in this case, the address corresponding to the line CL2 containing part B. The IC1 stage 31 processes that address to recover the search results for line CL2.

In the third cycle of fetch processing, the address for the line CL1 containing part A drops down to the IDA stage 35. In response to the hit (H) indication from the earlier cycle, the processing of the IDA stage 35 causes the register 41 in the IDA Data section 39 to capture bits, including the 16 bits of part A of the instruction, from the latch 37 at the bottom of the instruction cache 23. At the same time, the IC2 stage 33 uses the tag for line CL2 to recover data from that line of memory and loads the data to the latch 37 at the bottom of the instruction cache 23.

When the IDA stage 35 receives the first address, it examines the data coming down from the latch 37. Essentially, it is looking for the data for the desired instruction. As part of its analysis, it will identify whether the requested instruction crosses a cache line boundary.

Using ARM and Thumb as the examples of the instructions, a 32-bit Thumb instruction always begins with one of three possible values for the 5 most significant bits (11101; 11110; or 11111). Essentially, the logic can look at each 16-bit piece of the data in the latch 41. If the 5 most significant bits do not have one of the three required values for an a 32-bit instruction, then the 16-bits represent a Thumb instruction. However, each time the logic finds that the 5 most significant bits have one of the three values required for 32-bit instructions, then it recognizes the 16-bits as the first half of a 32-bit instruction. Assuming that the slot is not at the trailing end of the cache line, the next 16 bits on the line will be the other half of the 32-bit instruction. If the slot with one of the three values for 32-bit instructions, as the 5 most significant bits, is at the trailing end of the cache line, then the 32-bit instruction crosses the cache line boundary. Hence, the IDA stage 35 can determine that part A of the instruction is at the end of the first line CL1 but it needs to look to another line to find part B of the desired instruction.

Figure 6:
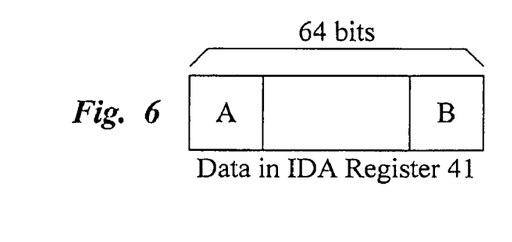
FIG. 6 depicts data in a 64 bit register, before instruction data alignment processing to compile selected bits into one 32-bit instruction.
Figure 7:
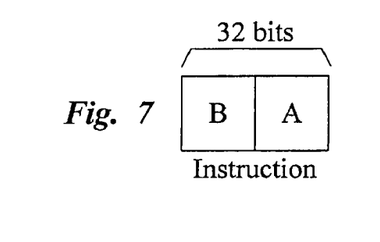
FIG. 7 depicts the resulting 32-bit instruction, recovered by fetching the two lines containing portions of the boundary crossing instruction

Initially, we assumed for this example that the other part of the instruction was contained in the next cache line CL2. During the second cycle of fetch processing, the cache 23 also provides a hit (H) indication on the H/M line 43 indicating that the CL2 line now in the latch 37 at the bottom of the cache 23 contains the desired part B of the instruction. In this way, the part B appears at the bottom of the cache. The IDA stage 35 again examines the 16-bit sections of the cache line data, and finds the 16-bit second piece of the instruction that crossed the boundary between line CL1 and line CL2. The IDA stage 35 causes the register 41 to capture that additional part B of the desired instruction. The 64-bit latch forming the register 41 now contains both pieces of the desired instruction, although the pieces may not be properly aligned, as represented diagrammatically by FIG. 6. Further processing by the IDA data stage 39 and the register 41 aligns and combines the data bits of the two parts A and B into one 32-bit instruction, as represented diagrammatically by FIG. 7, and passes the combined instruction to the Decode stage 13.

The preceding example, assumed that both parts A and B of the desired instruction were present in the CL1 and CL2 cache lines in instruction cache 23, that is to say, a hit-hit situation. Those skilled in the art will understand, however, that this will not always be the case. Situations will arise where the attempt to fetch the second part of the instruction will result in a cache miss, with respect to the instruction data in the accessed line of the instruction cache 23. Consider now the hit-miss case. The first part A is present in the CL1 line (hit), but part B is not initially present in the CL2 line when recovered by the processing of the IC2 stage 33 (miss).

As in the earlier example, during a first processing cycle, the IC1 stage 31 initially receives the address corresponding to the line CL1 containing part A and processes that address to recover search results for line CL1. In the next processing cycle, the IC2 stage 33 uses those search results to access the CL1 line and move the data on that line to the latch 37 at the bottom of the instruction cache 23. The cache 23 also provides a hit (H) indication on line 43 indicating that the CL1 line now in latch 37 at the bottom of the cache contains the desired part A of the instruction. While IC2 is processing the search results for CL1, that is to say during the second processing cycle, the IC1 stage 31 receives the next address, in this case, the address corresponding to the line CL2 expected to contain part B. The IC1 stage 31 processes that address to recover the search results for line CL2.

In the third cycle of fetch processing, the address for the line CL1 containing part A drops down to the IDA stage 35. In response to the hit (H) indication from the earlier cycle, the processing of the IDA stage 35 causes the register 41 in the IDA Data section 39 to capture bits, including the 16 bits of part A of the instruction, from the latch 37 at the bottom of the instruction cache 23. At the same time, the IC2 stage 33 attempts to use the search results for line CL2 to recover data from that line of memory and to load the data to the latch 37 at the bottom of the instruction cache 23.

To this point, processing of the hit-miss example is essentially the same as in the first hit-hit example. In this second example, however, when the IC2 stage 33 would otherwise move the data from the CL2 line to the latch 37, the cache 23 provides a miss (M) indication on the H/M line 43 indicating that the CL2 line now at the bottom of the cache 23 does not contain the desired part B of the instruction.

In this example, the A-B instruction crosses a cache line boundary, and the logic in the section 11 has determined that it has (successfully fetched) first part A of the instruction data in first line CL1 of data accessed from the instruction cache 23, but the second part B of the instruction data is not in the second line CL2 of data accessed from the cache 23. Hence, the logic of the IDA stage 35 invalidates the fetch of the address corresponding to the CL1 line (so as not to pass any instruction data to the Decode stage 13). Also, any stages of the pipeline higher than (preceding) the stage containing the second fetch address are flushed. In the illustrated three stage Fetch architecture, the IC1 stage 31 is the only stage above the IC2 stage that holds the address for the CL2 line, so the IC1 stage 31 is flushed.

At this point, the logic of the IDA stage 35 also return the first fetch address corresponding to CL1 back to the start of fetch pipeline 11, via a Re-Fetch stage 45. The Re-Fetch stage 45 serves to provide the recycled address as the next address input to the IC1 stage 31 in the next cycle and to reset the string of address inputs to that first address, so that subsequent input addresses are those that appropriately follow in order after the recycled address, in this case, after the address that identified the CL1 line and part A of the instruction. Of particular note, this means that when processing resumes with regard to that first address, the address corresponding to the line CL2 expected to contain part B, will again flow through the stages immediately after that first address, as in the first pass through the fetch pipeline 11.

During the third processing cycle, when it was determined that the second line CL2 produced a miss, the IC2 stage 33 converted the fetch for that line from a fetch (F) to a touch (T) or pre-fetch operation. A fetch operation retrieves an instruction and passes the instruction to the Decode stage 13, which in turn passes it on for eventual execution. A touch (T) or pre-fetch operation only pulls out the instruction, knowing that if the instruction is not yet in the instruction cache 23, the processing will load the instruction to that cache 23. The pre-fetch insures that the instruction data is in the instruction cache 23, for later processing, without dropping the instruction down to the later stages for execution. Where the operation resulted in a miss, that means that the touch processing will obtain the necessary instruction data from other memory resources, such as the L2 cache 25 and/or main memory 27, and the line of instruction data will be present the next time that the relevant address flows through the stages of the Fetch section 11.

The logic of the IC2 stage 33 includes a latch or the like containing a T/F type field 47, typically a flag bit, which indicates when an address in-process in that stage 33 relates to a Touch or a Fetch type operation. The logic of the IDA stage 35 includes a latch or the like containing a similar T/F type field 49. When the IC2 stage 33 passes an address to the IDA stage 35, the IC2 stage 33 passes the T or F type indication from its field 47 to the field 49 in the IDA stage 35.

Of note for purposes of this discussion, when the second address is initially received in the IC2 stage 33, the IC2 stages treats it as a fetch (F) operation. However, for the instruction crossing a cache line boundary, when the cache provides the miss (M) indication on line 43 indicating that the second piece B is not on the CL2 cache line, the IC2 stage changes the F in the type filed 47 to a T, effectively converting the fetch to a touch. Then, it passes the touch (T) indication to the IDA stage 35, as represented by the dotted line arrow in FIG. 1.

During the fourth processing cycle, when the first address has been passed to the Re-Fetch stage 45, the second address is passed to the IDA stage 35. With that address, the IC2 stage 33 now passes an indication that the address is to be used only for pre-fetch processing, e.g. by passing the touch indication (T) for use in the field 49 in the IDA stage logic. The IDA stage 35 also knows that the desired instruction data is not on the line in the cache, from the miss (M) indication on line 43. Hence, the IDA stage 35 and IDA Data section 39 can initiate steps to load the necessary instruction data from the higher level memory resource(s). The IDA elements 35, 39 and 41 treat the touch processing with respect to the second address as a pre-fetch, essentially to load data to the instruction cache 23, but do not pass any results to the Decode stage 13. As a result, an instruction line is loaded from higher level memory into the cache 23 and is available for later processing.

When the Fetch section 11 processes the first fetch with regard to the first address again, after re-cycling, the second address follows again, but the line for the second address is now in the L1 instruction cache 23. The part B for the desired instruction from the second line CL2 can be dropped down in with part A from the fetched first line CL2 during the IDA processing, replacing an otherwise unneeded piece of data in the line, to complete the desired instruction within one line of output from the Fetch section 11, exactly as in the hit-hit example discussed above. To appreciate these operations, however, it may be helpful to consider the operations of the touch for the second line address reaching the IDA stage in somewhat more detail.

The Fetch section 11 of the pipeline includes two fill buffers 51 and 53, used for transfer of instruction data from the L2 cache 25 to the register 41 in the IDA Data section 39. When a fetch type operation for a specified address reaches the IDA stage 35 and results in a miss (M), the IDA Data section 39 sends a request for the missing instruction line to the L2 cache 25. The L2 cache 25 may contain the data for the requested line, or if not, the L2 cache 25 obtains the data for the requested line, typically from main memory 27. The L2 cache 25 loads half of the line into the buffer 51 and the other half into the buffer 53. The logic of the IDA Data section 39 loads the relevant portion of the cache line data into the register 41, in a manner analogous to the loading of that data from the latch 37 in the cache 23 into the register 41. At the same time, the buffers 51 and 53 provide the entire line of instruction data to the instruction cache 23 for storage and future use.

In our hit-miss example, the touch for the second cache line address uses these operations of the IDA elements and the fill buffers to load the data for the necessary line CL2 into the instruction cache 23. Portions may go to the IDA data section but typically are not loaded into the IDA register 41, since no data is dropped to the Decode stage. The IDA stage considers this first flow with regard to that address to be a touch type operation, i.e. a pre-fetch only.

In the next cycle after the touch is complete, the first address is processed again at the IC1 stage 31 to identify the tag for the first cache line CL1. The IC1 stage 31 passes the first tag to the IC2 stage 33. In the next cycle, the IC2 stage reads the cache line IC1, while the second address is processed again at the IC2 stage 33 to identify the tag for the first cache line CL2. The processing of the IC2 stage 33 loads the data from the CL1 line to the latch 37, and in the next cycle, that line of data drops down with selected portions flowing to the IDA register 41. With the relevant CL1 data in the register 41, the IC2 stage 33 reads the cache line CL2 and loads the data from that line to the latch 37. On this second pass, the readings of both cache lines produce hits, as in the earlier hit-hit example.

In this way, the part B appears at the bottom of the cache on the second pass of the instructions through the pipeline of Fetch section 11, and the IDA stage 35 causes the register 41 to capture that additional part of the desired instruction. The 64-bit latch forming the register 41 now contains both pieces of the desired instruction, although the pieces may not be properly aligned, again as represented diagrammatically by FIG. 6. Further processing by the IDA data stage 39 and the register 41 aligns and combines the data bits of the two parts A and B into one 32-bit instruction, as represented diagrammatically by FIG. 7, and passes the combined instruction to the Decode stage 13, as in the earlier example.

In the example, when the processing returned the first fetch address to the start of the fetch pipeline 11, its initial pass was concurrently invalidated, so as not to pass to the Decode stage. Also, any stages of the pipeline higher than (preceding) the stage containing the second fetch address was flushed. When the first address is recycled, there are no address in-flight between it and the touch for the second address. When the pre-fetch is complete, the IDA stage 35 discards the address and the associated data in the IDA register 41. As a result, no instruction line data is output from the fetch pipeline 11 until the desired instruction is combined during the second pass through the instruction fetch pipeline.

With this type of processing, only the IDA elements can initiate a fetch from the higher level memory resources. This facilitates a high performance processor design, in that there is only one stage in the instruction fetch processing that makes requests to higher level memory resources. The recycled first address usually only spends one cycle in Refetch 45 before dropping back into IC1, IC2, and then IDA. In these cases, it usually is not possible that the L2 cache 25 has already returned the second piece of the instruction data to the cache 23 in time for the second pass through the fetch stages. Hence, IDA stage sits and waits on the L2 cache 25 and receives the second half of the instruction data directly from the fill buffers 51, 53.

In the preceding example, the processing of the two lines for the instruction crossing the cache line boundary resulted in a hit-miss, in that the first line contained part of the instruction but the second line did not. Substantially similar processing applies in the case where neither cache line contains the desired part of the instruction, that is to say the miss-miss case. In this later case, the processing for the first line obtains the data from the L2 cache 25 or main memory 27 and loads the line of instruction data into the instruction cache 23. Upon determining that the second line is a miss, the first address is recycled; the second fetch is converted to a touch; and processing continues as in the hit-miss example.

The case where the first cache line does not contain part of the desired instruction but the second line does (miss-hit) flows through the stages of the Fetch section 11 very much like for the case of a hit-hit. The processing of the first line results in a miss, but the IDA processing obtains the necessary line of instruction data from higher level memory resources. The bits are selected from the fill buffers 51, 53 to populate the IDA register 41 for the first line. After that, the processing of the second line from the latch 37 (the hit on the second line) is the same as in the hit-hit example.

To summarize the processing logic, a determination is made when an instruction fetch operation first reaches the IDA stage 35 and has all of the instruction data for its targeted cache line available. The IDA stage determines if the instruction crosses a line boundary. If not, the IDA stage processes the instruction in the normal manner. If there is a line boundary crossing, however, the logic of the IDA stage 35 looks to the hit/miss indication from the cache 23 to determine if there is a hit on the next line that should contain the second piece of the boundary crossing instruction. If so, then the IDA stage can capture the second piece from the cache and provide the complete instruction to the Decode stage 13. However, if there is a miss on the next line pending in the IC2 stage 33, that is to say if the next cache line does not contain the necessary second piece of the boundary crossing instruction, then the IDA and IC2 stages implement the processing taught herein.

In such a case, the IDA stage 35 invalidates the current fetch regarding the first address and recycles the address for the first cache line, e.g. through the Re-Fetch stage 45. The address for the second line drops down to the IDA stage 35. However, in so doing, the process for the second address has been converted from a fetch type operation to a pre-fetch type operation. The IC1 stage is flushed. The IDA stage initiates operations to load the necessary instruction data from the L2 cache 25 and/or from the main memory 27. By the time this upload is complete, the data is stored in the instruction cache 23, and the IC1 stage 31 can resume processing from the recycled first address. As the two addresses flow through the stages of the Fetch section 11 a second time, all necessary data for the boundary crossing instruction is present on the appropriate two lines in the cache memory 23, and the Fetch section can retrieve those pieces, compile the bits thereof into one instruction and output the instruction to the next stage down the pipeline 10, e.g. for decoding.

The processing outlined above applies when the instruction cache 23 is fully operational. However, similar processing may be applied to loading of data via the fill buffers 51 and 53, at times when the instruction cache 23 is disabled, e.g. during start-up. In that case, the process flow essentially results in a miss-miss situation in the lines of the cache 23. When the second address is converted to a touch, one of the fill buffers is used as a temporary cache to hold the relevant half of the line for the instruction piece B. When the first instruction cycles back through, the relevant portion of the first line is loaded to the other fill buffer, and the IDA Data section can compile the instruction from the two buffers 51 and 53, essentially as it would for an instruction that had not crossed a line boundary.

The numbers of bits given in the discussion above, such as the 16 and 32 bit lengths of the different types of instructions, the 8-word length of the cache lines and the various sizes of the latches, registers and buffers are representative examples, only. Those skilled in the art will recognize that instruction lengths and the sizes of various components may be longer or shorter in different processor architectures and implementations. Also, there may be a wider range of possible instruction sizes in the mix, e.g. 16-bit, 32-bit, 64-bit or more. Further, the number of stages in the Fetch section 11 or even in the pipeline 10 may vary considerably, yet the processor may implement its fetch processing of instructions crossing line boundaries in accord with teachings discussed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of fetching an instruction from memory for execution in a programmable processor, in which instructions may cross a memory line boundary, the method comprising: initially fetching a first line of instruction data in response to a first address; determining from the first line of instruction data if an instruction to be fetched crosses a boundary between the first line of instruction data and a second line of instruction data, wherein the fetched first line of instruction data contains a first piece of the instruction to be fetched; upon determining that the instruction to be fetched crosses the boundary, determining whether or not a line of cache memory corresponding to a second address contains a second piece of the instruction to be fetched; upon determining that the cache memory corresponding to the second address does not contain the second piece of the instruction to be fetched:
    (a) invalidating the initial fetching of the first line of instruction data and recycling the first address;
    (b) pre-fetching the second line of instruction data from a higher level memory resource;
    (c) in response to the recycled first address, fetching the first line of instruction data;
    (d) fetching the pre-fetched second line of instruction data in response to the second address; and
    (e) compiling the pieces of the instruction to be fetched from the fetched first and second lines of instruction data.

2. The method of claim 1, wherein the invalidating the initial fetching of the first line of instruction data prevents output of any of the instruction to be fetched from the initially fetched first line of instruction data to other elements of the programmable processor.

3. The method of claim 2, wherein the pre-fetching loads the second line of instruction data from the higher level memory resource into the cache memory without output of any of the second line of instruction data to other elements of the programmable processor prior to the subsequent fetching of the second line of instruction data from the cache memory.

4. The method of claim 3, wherein the step of pre-fetching entails converting a fetch operation with regard to the second address to a touch operation with regard to the second address.

5. The method of claim 1, further comprising flushing any fetch related processing that may have already begun with respect to a subsequent address, upon the determining that the cache memory corresponding to the second address does not contain the second piece of the instruction to be fetched.

6. A method of fetching an instruction for a programmable processor, comprising:
    detecting that an instruction to be fetched crosses a boundary between instruction lines;
    upon fetching a first line of instruction data containing a first piece of the boundary crossing instruction, detecting that a second piece of the boundary crossing instruction is not in cache memory;
    in response to detecting that the second piece is not in the cache memory, recycling the fetch of the first line of instruction data without output of any of the instruction to be fetched from the first line of instruction data;
    pre-fetching a second line of instruction data;
    based on the recycling, fetching the first line of instruction data, and fetching the pre-fetched second line of instruction data; and
    combining the pieces from the fetched first and second lines of instruction data to output the boundary crossing instruction.

7. The method of claim 6, wherein the recycling of the fetch of the first line comprises invalidating any portion of the instruction to be fetched from the first line that has been fetched prior to the detection that the second piece is not in the cache memory.

8. The method of claim 6, wherein the pre-fetching of the second line includes converting a fetching operation with regard to the second line to the pre-fetching with regard to the second line.

9. The method of claim 6, further comprising flushing any fetch operation in progress between the pre-fetching of the second line and the re-cycled fetching of the first line.

10. A fetch section for a pipeline processor, comprising:
    an instruction cache;
    a first instruction cache processing stage for identifying a cache line corresponding to each respective address in an input string of addresses;
    a second instruction cache processing stage, responsive to each identification of a cache line, for reading instruction data from a line of memory in the cache corresponding to the respective address;
    an instruction data alignment section, responsive to one or more lines of instruction data read by the second instruction cache processing stage for outputting fetched instructions, the instruction data alignment section also obtaining data from a higher level memory resource for any instruction or portion thereof not initially found in the instruction cache; and
    means for recycling a fetch with regard to a first address to the first instruction cache processing stage and for converting a fetch with regard to second address to a pre-fetch to cause the instruction data alignment section to load a line of instruction data from the higher level memory resource to the instruction cache, upon detecting an instruction crosses a boundary between lines corresponding to the first and second addresses and a line of the cache corresponding to the second address does not initially contain a piece of the boundary crossing instruction.

11. The fetch stage of claim 10, wherein each line of the instruction cache can store a plurality of instructions of two or more different lengths.

12. The fetch stage of claim 10, wherein the means for recycling include a re-fetch stage for passing the first address back to an input of the first instruction cache processing stage.

13. The pipeline processor comprising the fetch stage of claim 10, further comprising a decode stage for decoding the fetched instructions, a readout stage for obtaining operand data for processing in accord with decoded instructions, an execution stage for executing decoded instructions on operand data, and a write-back stage for writing execution results to storage.

14. A fetch section for a pipeline processor, comprising:
   an instruction cache;
   at least one processing stage for processing each of a plurality of addresses in sequence, to identify a line of memory in the instruction cache that may contain an instruction or a portion thereof corresponding to each respective address and to read data from the identified line; and
   means for detecting an instruction to be fetched crossing a cache line boundary and absence of a portion of the boundary crossing instruction in a second of two addressed cache lines, and in response, for invalidating a fetch with regard to an address corresponding to a first of the two cache lines and recycling the corresponding address for input to the at least one processing stage and pre-fetching data containing the absent portion to the second cache line from higher level memory to enable complete fetching of the instruction crossing the boundary on a second flow of the corresponding address through the fetch section.

15. The fetch section as in claim 14, wherein the at least one processing stage includes:
   a first instruction cache processing stage for identifying a cache line corresponding to each respective address in an input string of addresses;
   a second instruction cache processing stage, responsive to each identification of a cache line, for reading instruction data from a line of memory in the cache corresponding to the respective address; and
   an instruction data alignment section, responsive to one or more lines of instruction data read by the second instruction cache processing stage for outputting fetched instructions, the instruction data alignment section also obtaining data from a higher level memory resource for any instruction or portion thereof not initially found in the instruction cache.

16. The fetch stage of claim 14, wherein each line of the instruction cache can store a plurality of instructions of two or more different lengths.

17. The fetch stage of claim 14, wherein the means for recycling include a re-fetch stage for passing the first address back to an input of the at least one processing stage.

18. The pipeline processor comprising the fetch stage of claim 14, further comprising: a decode stage for decoding the fetched instructions, a readout stage for obtaining operand data for processing in accord with decoded instructions, an execution stage for executing decoded instructions on operand data, and a write-back stage for writing execution results to storage.

* * * * *